(12) United States Patent
Krabbendam et al.

(10) Patent No.: US 8,756,858 B2
(45) Date of Patent: Jun. 24, 2014

(54) PROCESS AND DEVICE TO ACCELERATE GROWTH

(75) Inventors: Peter Krabbendam, Haarlem (NL); Felix Pieter Oudshoorn, Diemen (NL)

(73) Assignee: Linde AG, Wiesbaden (DE)

( * ) Notice: Subject to any disclaimer, the term of this patent is extended or adjusted under 35 U.S.C. 154(b) by 833 days.

(21) Appl. No.: 12/297,206

(22) PCT Filed: Apr. 11, 2007

(86) PCT No.: PCT/EP2007/003231
§ 371 (c)(1), (2), (4) Date: Apr. 27, 2009

(87) PCT Pub. No.: WO2007/118662
PCT Pub. Date: Oct. 25, 2007

(65) Prior Publication Data
US 2009/0217577 A1  Sep. 3, 2009

(30) Foreign Application Priority Data

Apr. 13, 2006 (DE) .......................... 10 2006 017 813

(51) Int. Cl.
*A01G 9/00* (2006.01)
*A01G 7/02* (2006.01)
*A01G 1/00* (2006.01)
*A01G 9/18* (2006.01)

(52) U.S. Cl.
CPC *A01G 7/02* (2013.01); *A01G 1/002* (2013.01); *A01G 9/18* (2013.01)

USPC .................................................. 47/17; 47/29.1

(58) Field of Classification Search
CPC .............. A01G 9/00; A01G 7/02; A01G 9/18
USPC ......... 47/17, 29.1, 29.5, 31, 58.1 R; 119/420, 119/677, 678
See application file for complete search history.

(56) References Cited

U.S. PATENT DOCUMENTS 3,274,730 A * 9/1966 Bose .......................... 47/1.01 R
3,348,922 A * 10/1967 Bose et al. .................... 422/208
(Continued)

FOREIGN PATENT DOCUMENTS

EP        0561193 A2    9/1993
EP        0561193 A3    2/1995
(Continued)

OTHER PUBLICATIONS

Bazzaz et al, the response of plants to elevated $CO_2$, Oecologia (Berlin), 62:196-198 (1984).
(Continued)

*Primary Examiner* — Rob Swiatek
*Assistant Examiner* — Ebony Evans
(74) *Attorney, Agent, or Firm* — Wilson Sonsini Goodrich & Rosati

(57) ABSTRACT

A process to accelerate growth and regenerate lawns whereby the lawn (2) is at least partially surrounded on the top by a space (4) that is open downward and surrounded on all sides and whereby $CO_2$ is fed into the space (4) and the space (4) covered by the lawn (2) is outfitted with a lighting system (14) and is subjected to light and a device for executing this process are disclosed.

22 Claims, 3 Drawing Sheets

(56) References Cited

U.S. PATENT DOCUMENTS

| | | | | |
|---|---|---|---|---|
| 3,381,409 | A | * | 5/1968 | Lamont ............... 47/17 |
| 3,718,533 | A | * | 2/1973 | Shigeru Shibata ............ 428/215 |
| 3,949,522 | A | * | 4/1976 | Kehl et al. ............ 47/17 |
| 4,012,867 | A | * | 3/1977 | Lainchbury et al. ............ 47/17 |
| 4,067,347 | A | * | 1/1978 | Lipinski ............ 126/624 |
| 4,146,993 | A | * | 4/1979 | Freeman, Sr. ............ 47/17 |
| 4,163,342 | A | * | 8/1979 | Fogg et al. ............ 47/58.1 R |
| 4,292,762 | A | * | 10/1981 | Fogg et al. ............ 47/17 |
| 4,569,150 | A | * | 2/1986 | Carlson et al. ............ 47/17 |
| 4,622,950 | A | * | 11/1986 | Greenbaum ............ 126/618 |
| 5,392,611 | A | * | 2/1995 | Assaf et al. ............ 62/94 |
| 5,813,168 | A | * | 9/1998 | Clendening ............ 47/17 |
| 6,260,308 | B1 | * | 7/2001 | Looney ............ 52/63 |
| 6,578,319 | B1 | * | 6/2003 | Cole et al. ............ 47/61 |
| 8,397,434 | B2 | * | 3/2013 | Bayne ............ 52/2.11 |
| 8,438,779 | B2 | * | 5/2013 | Townsley ............ 47/17 |
| 2004/0118038 | A1 | * | 6/2004 | Hilel et al. ............ 47/17 |
| 2011/0099895 | A1 | * | 5/2011 | Berghoff et al. ............ 47/17 |

FOREIGN PATENT DOCUMENTS

| | | |
|---|---|---|
| EP | 1269815 A1 | 1/2003 |
| RU | 2045162 C1 | 10/1995 |
| RU | 2335118 C2 | 10/2008 |
| SU | 1014520 A1 | 4/1983 |
| SU | 1093294 A1 | 5/1984 |
| SU | 1598917 A1 | 10/1990 |

OTHER PUBLICATIONS

RU2008135328/21 Office Action dated Aug. 3, 2010 (w/ English Translation).
RU2008135328/21 Decision to Grant dated Mar. 3, 2011 (English Translation).
UAa200813127 Decision to Grant dated Oct. 4, 2011 (English translation).
RU2008135328/21 Allowed Claims.
UAa200813127 Allowed Claims.

* cited by examiner

PROCESS AND DEVICE TO ACCELERATE GROWTH

The invention relates to a method and a device for accelerating the growth of lawn, in particular in soccer stadiums and the like.

Whereas soccer stadiums and sports arenas in former times often had tribunes without any roofing, which were arranged with a relatively small slope angle and with a certain distance to a lawn field, for instance separated by tracks and athletic sports facilities, the trend is to build the tribunes as far as to the field margin of soccer grounds, to arrange the tribunes with a relatively steep angle in order to offer the audience a good view to the field and, moreover, to provide such soccer stadiums with a roof at least in the region of the tribunes, in part even with a full covering.

In these modern soccer stadiums, the incidence of light and the light intensity are extremely limited, on the one hand, by the covering and through the fact that only a section directly above the lawn has no roofing, if any.

In particular during the winter months, in which the lawn shows hardly any growth due to the temperature, because usual, the lawn forming grass sorts hardly grow below 5° C. air temperature, such sports lawns are stressed to an extremely high extent.

As the frequency of the games increases in particular in the field of professional soccer, during winter and partially even in summer the regeneration ability of the grass plants is not so high anymore, that the damages due to the ongoing games could be compensated for.

It is therefore known to cultivate such lawn forming grass plants in agricultural scale and to correspondingly condition them as lawn, to excavate the lawn when required and to roll it up into coils and to place it in soccer stadiums, after the process of removing the corresponding usable lawn layer at that place.

It is a disadvantage here that the removal of a damaged lawn area and the installation of a new lawn area are extremely expensive. In many cases there is the problem that a new lawn area ceases its growth under the conditions prevailing in the stadium.

In order to enhance the regeneration ability of a lawn, it is known to pull panels over the lawn, in which light emitting diodes are contained. This system, which is commercially available by the firm Intravision under the trademark "Lumigren", consists essentially of a rail system on which the textile panels with integrated light emitting diodes can be unrolled, and a venting system which brings about a circulation of air.

The firm SGL, Waddinxveen, The Netherlands, organizes a lawn management in which the growth of the lawn, the light acting on the lawn, the temperature, the water supply, the introduction of fertilizers and the mowing are measured. Each of these growth parameters is individually altered. If applicable, the lawn is artificially illuminated.

This system indeed improves the light supply of the grass plants. In particular in winter, however, a heavily damaged lawn can not be regenerated any longer hereby.

EP 0 561 193 A2 shows a method and a device for promoting the growth of plants. The grass is nearly completely covered by the device. For promoting the growth of grass underneath a closed cover it is provided to expose the grass to light by means of artificial light sources within 24 hours for a period of approx. 8 to 12 hours. The atmosphere, to which the grass is exposed, is stirred continuously or in intervals by two ventilators and/or is exchanged continuously or from time to time. The amount of carbon dioxide, which is absorbed by the grass, is to be supplied to the atmosphere of the space continuously or in time periods by a means for introducing carbon dioxide. By this method and this device it is said to make grass grow at any time of the year in correspondence with the natural prerequisites. The device can be integrated in flat ground plates for covering a lawn area.

EP 1 269 815 A describes a device for gassing lawn areas. In doing so, a gas channel which extends across a lawn area, supplies a gas flow to the lawn area. The gas channel has one open end coupled to a pressure unit and the other end is closed. In a region facing the lawn area, the gas channel has outlet openings. Sensors are provided in a further development of the device, which detect one or several measured variables such as the ambient temperature, ambient air moisture, lawn temperature, lawn humidity, gas inlet temperature, gas outlet temperature, inlet gas humidity, outlet gas humidity, the proportion of carbon dioxide as well as the proportion of fertilizers and transmit to a regulating/controlling apparatus, with which the pressure unit and/or the supply of water vapor and/or carbon dioxide and/or fertilizers and/or the heating unit can be adjusted.

It is the object of the invention to provide a method of accelerating the growth and the regeneration of a lawn, with which phases of high growth and regeneration are possible even in winter.

The object is achieved with a method including the features of claim 1.

Advantageous further developments are distinguished in the dependent sub-claims.

A further object is to provide a device for executing the method, which can be produced easily, quickly, and in a short time and at favorable costs, which allows an effective application of the method and can be handled easily.

The object is achieved with a device including the features of claim 8.

Advantageous further developments are set out in the dependent sub-claims.

The method according to the invention makes provision for erecting an enclosed space above a limited lawn area, with lighting means being present in the enclosed space and illuminating the lawn which is located underneath the lighting means. Here, the illumination is preferably carried out with a wavelength which promotes the photosynthesis of the lawn forming grass plants particularly well. Mercury vapor lamps including corresponding filters, if applicable, or fluorescent tubes with the appropriate light spectrum are particularly suited for this purpose.

Moreover, $CO_2$ is fed into the enclosed space, the $CO_2$ concentration being permanently monitored in the enclosed space and the $CO_2$ supply being controlled in a corresponding way. It is possible hereby to adjust a $CO_2$ concentration of at least 500 ppm $CO_2$ and preferably at least 800 ppm $CO_2$, which is distinctly increased compared to the natural concentration (approx. 350 ppm $CO_2$). A natural $CO_2$ concentration is adjusted in the method which is known from EP 0 561 193 A2. Any consumed $CO_2$ is substituted here. By mounting the lamps at a low level, a regular air exchange is required, so as not to exceed the desired temperature; that is why it is not possible to permanently maintain the $CO_2$ concentration clearly above the natural value.

By the presence of $CO_2$, the warmth which is introduced by the light is retained to a higher degree ("greenhouse effect"), whereby the warming within the enclosed space is supported.

As all modern soccer stadiums and all modern sports facilities including a sports lawn have an appropriate lawn heating installation, the size or volume of the enclosed space is selected such that the space volume is heated up by the lawn heating installation within a sufficiently short time to a temperature in such a manner that a growth of the lawn forming grass plants is possible. What is more, the warming may be accomplished by the waste heat of the lighting means solely or additionally.

With the presence of a lawn heating installation or the waste heat of the lighting means, it is further possible to do without any circulating means for circulating the supplied carbon dioxide, because this circulation will take place by convection.

The lighting means preferably are arranged at a height of 1.80 m to 2.80 m above the lawn area.

The $CO_2$ may be fed in at the uppermost point or the uppermost region of the space and falls downward by its specific weight which is higher compared to air.

The enclosed space advantageously is a tent or a tent-like structure made up of an essentially gas-tight tent wall, which extends from an upper region or a tent roof or a tent roof wall as far as to the lawn.

In order to avoid gas losses and also minimize temperature losses, the tent wall is formed, for instance, of a foil, if required, in combination with a textile, tear-proof layer.

In a preferred embodiment, the tent wall has isolation properties, as it includes a foamed material foil sheet or by arranging air chambers between an inner foil wall and an outer foil wall.

At a lower edge standing on the lawn, the tent preferably can be formed with a reinforcement, while surrounding blade-like elements extend downward and engage the subsoil, in this way allowing a safe stand and a good sealing.

The method additionally makes provision to install such an enclosed space or several of these enclosed spaces on a lawn area, to let the lighting and the $CO_2$ act on the lawn, and to dislocate the tent after a sufficiently long action time. To this purpose and according to the invention, an automated dislocation with a rail system and/or a cable pull system can be used apart from a manual dislocation. With such an embodiment, rolls can be present on the lower side instead of anchoring the space on the soil, with which the enclosed space can be pulled across the lawn. Skids or rails, however, are also conceivable to this end.

The invention will be exemplarily explained by means of a drawing wherein.

Figure 1:
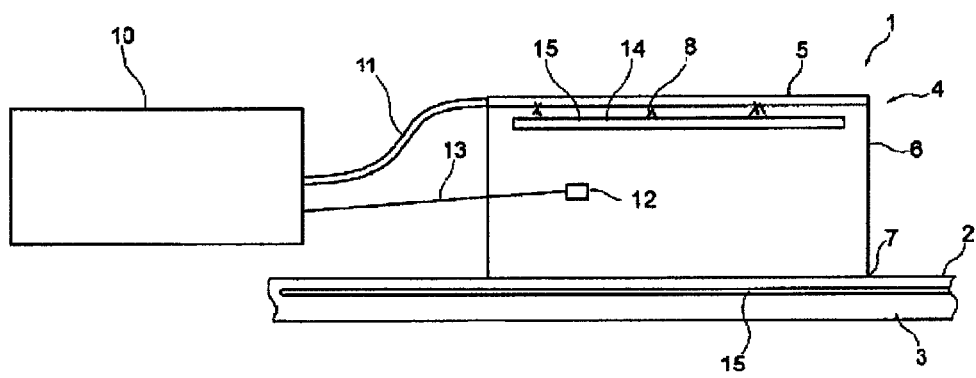
FIG. 1 shows the device according to the invention in a longitudinal section.

The device 1 according to the invention is arranged on a lawn 2 which is to be regenerated and grows on a subsoil 3.

The device 1 includes an enclosed space 4 with a ceiling wall 5 and side walls 6. The ceiling wall 5 and the side walls 6 are preferably firmly connected with each other and, if need may be, have a not shown supporting structure.

The enclosed space 4 is in particular a tent 4 which has an open bottom and rests on the lawn 2 with side wall edges 7.

Figure 2:
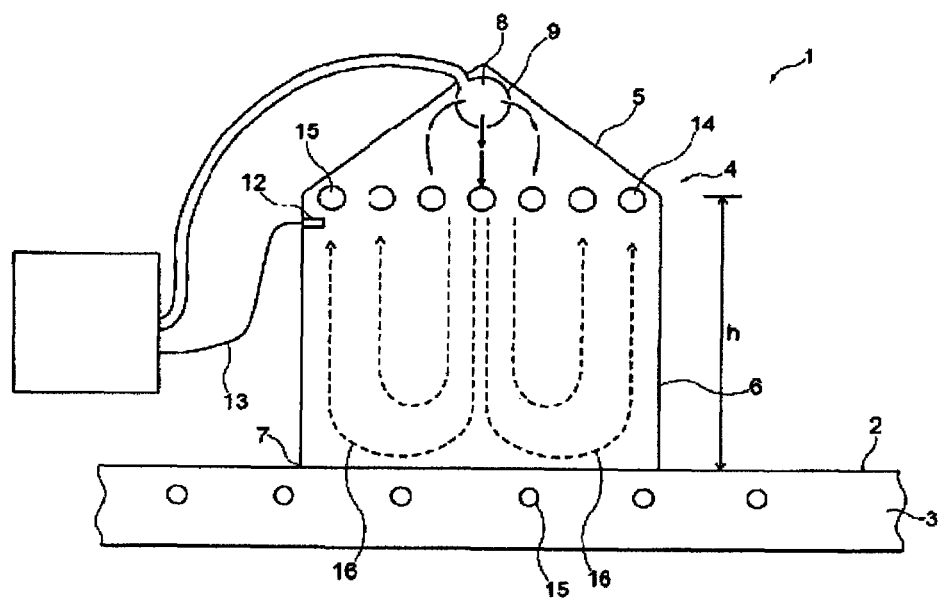
FIG. 2 shows the device according to the invention in a strongly schematic form in a cross section.

The enclosed space 4 or the tent 4 may be formed so as to be block-shaped or can have a sloping mono-pitch roof or a pitched roof (FIG. 2).

In an upper region or underneath a roof wall 5, an effusion device 8 for gas is present, which is a tube-like structure 8, for instance, extending along a partial length or the entire length of the space 4. The tube 8 or the tube-like structure 8 has outflow openings 9 from which a $CO_2$ gas can escape.

The $CO_2$ gas originates from a gas reservoir 10 which is connected to the tube-like structure 8 with a corresponding supply line 11.

In order to monitor the $CO_2$ content in the enclosed space 4 or the tent 4, a $CO_2$ measuring apparatus or a $CO_2$ sensor 12 is connected through a line 13 preferably with the gas reservoir 10, a corresponding control unit (not shown) for controlling/regulating the gas content being provided.

At a height h as measured from the ground 2 or lawn 2, a lighting means 14 is provided in the enclosed space 4 or in the tent 4, which consists of light bulbs or gas discharge lamps, for instance. It is preferred to use photosynthesis lamps such as, for example, the lamps which are produced by General Electric Comp. and sold under the trademark Lucalox PSL.

In one embodiment, the lighting means 14 consists of fluorescent tubes 15, for example, which extend into the enclosed space 4.

By virtue of a lawn heating installation 17 which is provided in the ground 3 underneath the lawn 2, the $CO_2$ effusing from the tube-like structure 8 which streams downwards respectively falls, will circulate within the enclosed space 4, while the convection will provide for that with a central introduction of the $CO_2$ from the roof the $CO_2$ will flow upwards in the peripheral areas (arrows 16 in FIG. 2).

It has been found that the heat development of the lighting means 14 is absolutely sufficient for developing such convection, so that a sufficient convection is ensured even in stadiums which have no lawn heating installation 17.

In the embodiment explained above, a tube 8 is used for supplying the $CO_2$ gas. It has turned out, however, that it is possible in the context of the invention to use individual, point-shaped nozzles instead of such a tube, since the convection existing in the enclosed space makes sure that the $CO_2$ gas will be uniformly distributed.

The lighting means are provided at a level h from 1.80 m to 2.80 m, or 2.20 m to 2.50 m, the $CO_2$ feed line 8 being provided approximately 20 to 80 cm and preferably 50 cm above the lighting means.

It is of advantage with the method and the device according to the invention, that they are configured so as to have a very simple structure. Due to the gas tight encapsulation according to the invention by means of an enclosed space 4 or tent 4, a significant temperature rise is brought about by the heat development of the lighting means, optionally also by the heat development through a lawn heating installation, such temperature increase being sufficient to allow a growth of the lawn forming grass plants.

By means of the heat development of the lighting means, on the one hand, and if need be by a lawn heating means, on the other hand, a uniform $CO_2$ concentration is achieved by convective distribution.

The $CO_2$ concentration is in the range from 500 to 1500 ppm and preferably in the range from 800 to 1200 ppm $CO_2$ or 800 to 2000 ppm $CO_2$. The natural $CO_2$ concentration amounts to approximately 350 ppm. A substantially higher growth of the lawn 2 is achieved by the increased $CO_2$ concentration.

With the method and the device according to the invention, it is possible to achieve optimal conditions for the lawn even in cold winter months and with high stress of the lawn area. This is established in a simple way by a light intensity which is higher than with day light and by means of a high $CO_2$ concentration with sufficiently high temperatures.

Even during the winter months, the inventors could observe a growth of approx. 0.5 mm per hour of the lawn forming grass plants. The outdoor temperatures were approx. 5° C. to 6° C. here. The temperatures which were measured in the lawn were distinctly higher. This was, on the one hand, due to the fact that a ground heating installation was used. But it was also the heat input by the lamps as well as the heat retention effect by the tent and the $CO_2$ concentration which have contributed to the temperature rise in the lawn. In this way, a temperature of 21° C. in the lawn was achieved.

The tents 4 or enclosed spaces 4 according to the invention have a base area of approx. 10×30 m to 15×30 m or 30 m² to 400 m². Smaller tents 4 are used in order to groom areas which are locally stressed to a high degree, such as for instance the area around the goal.

Figure 3:
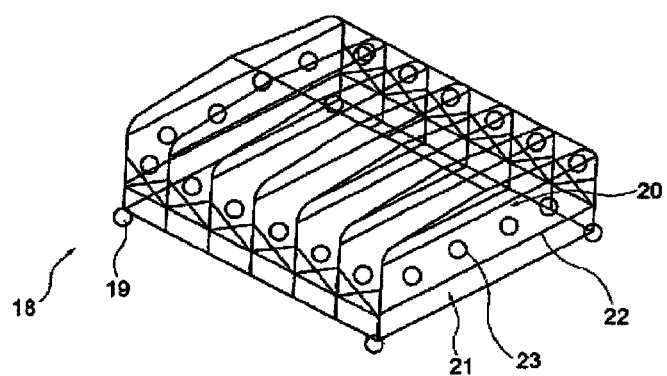
FIG. 3 shows a further embodiment of the device according to the invention in a schematic, perspective view without the lighting means and without the effusion device.

In a further embodiment of the present invention the device 1 encompasses several segments 18 which are connected to each other (FIG. 3). The construction conforms to the embodiment described above.

Each of the segments 18 shows a length of approx. 5 m and a width of approx. 6 m. Two to five of these segments 18 can form a tunnel covering an area of approx. 150 m². It is possible to regenerate the lawn area of a stadium (approx. 7000 m²) section by section with, for instance, four of these tunnels (approx. 600 m²).

The individual segments 18 of these tunnels are provided with wheels 19 in their lower peripheral region, so that they can be moved on the lawn 2 which is to be regenerated.

Figure 4:
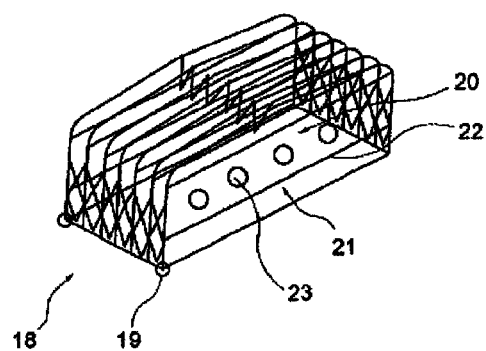
FIG. 4 shows the embodiment showing FIG. 3 in the folded state in a perspective view.

The segments 18 of the device 1 are designed so as to be collapsible (FIG. 4). In the folded state they show a length of approx. 80 cm and can be displaced with a simple lifting apparatus, for instance a fork lift.

The ceiling wall 5 and the side walls 6 are preferably formed of a transparent foil which is light-transmissive so that the lawn 2, which is to be regenerated, can be provided with sun light. This allows switching off the lighting means 14 at day light, whereby energy is saved in a substantial amount.

At a level h as measured from the lawn 2, each segment 18 is provided with lighting means 14 in the form of six lamps, for instance. The lamps are assimilation lamps by Philips, which have been especially developed for the photosynthesis, with e.g. 600 W and an illumination level of 100 to 200 $\mu mol/m^2 s$.

The lamps are arranged at a level h from 1.6 m to 2.0 m and preferably of 1.8 m.

The lamps increase the ambient temperature by approx. 10° C. That will do in many cases, in order to achieve even in winter a temperature of 3° C. to 5° C. which the lawn needs for growing.

With high outdoor temperatures it may be expedient to arrange the lamps so that they are specially separated from the gassed space, because these develop the major part of the heat. Excessively high temperatures would be harmful for the growth of the lawn 2. This is why the device 1 of the invention according to a further embodiment has an illumination space 20 in which the lighting means 14 are arranged, and a regeneration space 21 in which the effusion device 8 is arranged. The illumination space 20 and the regeneration space 21 are separated from each other by a second ceiling wall 22 which is configured so as to be transparent or light-transmissive in order to let the sun radiation pass. The second ceiling wall 22 closes the regeneration space 21 so as to be gas-tight and is arranged at a level of approx. 50 cm above ground.

The lamps are arranged in the illumination space 20 underneath the ridge. The sidewalls 6 are provided with venting means 23 which are configured as vent openings 23, in order to remove the heat of the lamps.

Due to the special separation and/or the opened venting openings 23, an additional warming up of the regeneration room 21 is prevented.

The embodiment shown in FIGS. 3 and 4 may also be configured without any subdivision of the enclosed space 4 into an illumination space 20 and a regeneration space 21.

The $CO_2$ concentration preferably amounts to between 800 ppm $CO_2$ and 2000 ppm $CO_2$.

It is provided according to the invention that the system or the device, respectively, or the method is placed at a certain area and is operated four to twelve hours and preferably ten to twelve hours, and is then moved in order to be operated again at a next place.

LIST OF REFERENCE SYMBOLS

1 Device according to the invention
2 Lawn
3 Subsoil
4 Enclosed space/tent
5 Ceiling wall
6 Side walls
7 Side wall edges
8 Effusion device
9 Outflow openings
10 Gas reservoir
11 Supply line
12 $CO_2$ sensor
13 Line
14 Lighting means
15 Fluorescent tubes
16 Arrows
17 Lawn heating installation
18 Segment
19 Wheels
20 Illumination space
21 Regeneration space
22 Second ceiling wall
23 Venting means

The invention claimed is:

1. A device for accelerating the growth and regenerating lawn areas, comprising an enclosed space in a tent (4) which has an open bottom and can be placed on a lawn area (2), a lighting means (14) for a lawn area (2), which is to be illuminated, being present in the space (4), and an effusion device (8) for $CO_2$ gas being additionally provided, which is arranged so as to emit $CO_2$ from a gas reservoir (10) into the space (4), characterized in that gas content in the space (4) is set to 500 to 2000 ppm $CO_2$, wherein the tent (4) comprises an essentially gas-tight tent wall, and wherein the tent wall is formed so as to be isolating, comprising a foamed material foil sheet or air chambers arranged between two foil walls.

2. The device according to claim 1, characterized in that the illumination means are arranged at a level of 1.80 m to 2.80 m above the lawn area.

3. The device according to claim 1, characterized in that the $CO_2$ effusion device (8) is arranged above the illumination means (14).

4. The device according to claim 1, characterized in that the effusion device (8) is arranged in the highest portion or at the highest point of the enclosed space (4).

5. The device according to claim 1, characterized in that the tent wall comprises a gas-tight foil.

6. The device according to claim 1, characterized in that the tent wall is formed so as to be transparent or light-transmissive at least in portions.

7. The device according to claim 1, characterized in that the enclosed space (4) has an illumination space (20) in which the illumination means (14) is arranged, and a regeneration space

(21) which is arranged underneath the illumination space (20) and which has the effusion device (8) arranged in it.

8. The device according to claim 1, characterized in that the tent wall comprises a textile.

9. The device according to claim 8, characterized in that the tent wall comprises a tear-proof layer.

10. The device according to claim 1, characterized in that the tent wall comprises an air bubble foil.

11. The device according to claim 1, characterized in that the tent is formed with a reinforcing at a lower edge resting on the lawn (2), blade-like elements being provided along the periphery which extend downwards and engage the subsoil for effecting a gas tightness.

12. The device according to claim 1, characterized in that the device comprises the tent with a ceiling wall (5) and side walls (6), the ceiling wall (5) and the side walls (6) being firmly connected with each other, characterized in that the connection of the ceiling wall and the side walls is gas-tight.

13. The device according to claim 12, characterized in that the side walls (6) are gas-tight.

14. The device according to claim 1, characterized in that the gas reservoir (10) is provided for storing $CO_2$ gas, the reservoir being connected with a tube (8) or a tube-like structure (8) by means of a corresponding supply line (11).

15. The device according to claim 1, characterized in that a $CO_2$ measuring apparatus or a $CO_2$ sensor (12) is present in the tent (4) for monitoring the $CO_2$ content, which is connected with a control means for regulating the concentration of $CO_2$ gas to a predetermined value.

16. The device according to claim 15, characterized in that the $CO_2$ concentration amounts to at least 500 ppm $CO_2$ or at least 800 ppm $CO_2$.

17. The device according to claim 1, characterized in that the illumination means (14) consists of light bulbs, gas discharge lamps, metal vapor lamps, or fluorescent tubes (15).

18. The device according to 1, characterized in that the enclosed space (4) comprises a base area of 5 m×6 m to 20 m×40 m.

19. The device according to claim 1, characterized in that the enclosed space (4) comprises a base area of 30 $m^2$ to 400 $m^2$.

20. A device for accelerating growth and regenerating lawn areas, comprising an enclosed space in a tent (4) which has an open bottom and can be placed on a lawn area (2), a lighting means (14) for a lawn area (2), which is to be illuminated, being present in the space (4), and an effusion device (8) for $CO_2$ gas being additionally provided, which is arranged so as to emit $CO_2$ from a gas reservoir (10) into the space (4), characterized in that gas content in the space (4) is set to 500 to 2000 ppm $CO_2$, wherein the tent comprises an essentially gas-tight tent wall, wherein the tent wall is formed so as to be isolating, comprising a foamed material foil sheet or air chambers arranged between two foil walls, wherein the enclosed space (4) has an illumination space (20) in which the illumination means (14) is arranged, and a regeneration space (21) which is arranged underneath the illumination space (20) and which has the effusion device (8) arranged in it, wherein the regeneration space (21) is separated in a gas-tight manner from the illumination space (20) by a transparent or light-transmissive second ceiling wall (22).

21. A device for accelerating growth and regenerating lawn areas, comprising an enclosed space in a tent (4) which has an open bottom and can be placed on a lawn area (2), a lighting means (14) for a lawn area (2), which is to be illuminated, being present in the space (4), and an effusion device (8) for $CO_2$ gas being additionally provided, which is arranged so as to emit $CO_2$ from a gas reservoir (10) into the space (4), characterized in that gas content in the space (4) is set to 500 to 2000 ppm $CO_2$, wherein the tent comprises an essentially gas-tight tent wall, wherein the tent wall is formed so as to be isolating, comprising a foamed material foil sheet or air chambers arranged between two foil walls, wherein the enclosed space (4) has an illumination space (20) in which the illumination means (14) is arranged, and a regeneration space (21) which is arranged underneath the illumination space (20) and which has the effusion device (8) arranged in it, wherein the illumination space (20) comprises vent openings (23).

22. A device for accelerating growth and regenerating lawn areas, comprising an enclosed space in a tent (4) which has an open bottom and can be placed on a lawn area (2), a lighting means (14) for a lawn area (2), which is to be illuminated, being present in the space (4), and an effusion device (8) for $CO_2$ gas being additionally provided, which is arranged so as to emit $CO_2$ from a gas reservoir (10) into the space (4), characterized in that gas content in the space (4) is set to 500 to 2000 ppm $CO_2$, wherein the tent comprises an essentially gas-tight tent wall, wherein the tent wall is formed so as to be isolating, comprising a foamed material foil sheet or air chambers arranged between two foil walls, and wherein the effusion device (8) is a tube (8) or a tube-like structure (8), which extends along a partial length or the entire length of the space (4), the tube (8) or the tube-like structure (8) having outflow openings (9) from which the $CO_2$ gas may escape.

\* \* \* \* \*